UNITED STATES PATENT OFFICE.

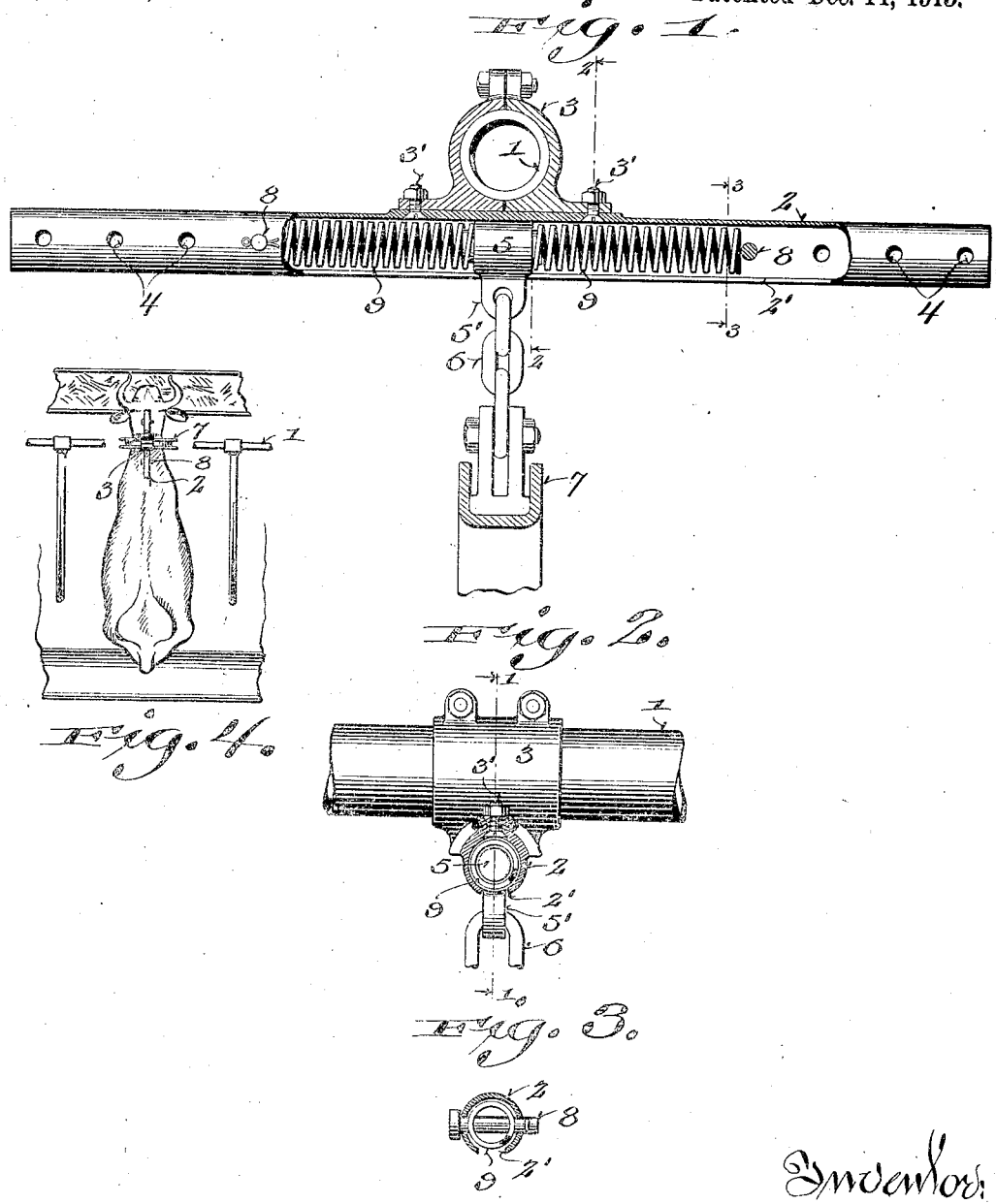

WILLIAM F. WEBER, OF OCONOMOWOC, WISCONSIN.

STANCHION-HANGER.

1,163,723.

Specification of Letters Patent.

Patented Dec. 14, 1915.

Application filed June 18, 1914. Serial No. 845,763.

*To all whom it may concern:*

Be it known that I, WILLIAM F. WEBER, a citizen of the United States, and resident of Oconomowoc, in the county of Waukesha and State of Wisconsin, have invented certain new and useful Improvements in Stanchion-Hangers; and I do hereby declare the following is a full, clear, and exact description thereof.

My invention has for its object to provide a simple, economical and effective hanger for animal stanchions, the arrangement and construction being such as to permit the stanchion to yield longitudinally of the stall under spring pressure from a predetermined point, whereby the animal is free to move forward or backward under a slight drawing tension. Thus the said animal will assume its normal alined position with reference to the head and foot of the stall under ordinary conditions.

Another object of my invention is to provide means whereby the longitudinal yieldable hanger may be adjusted back and forth to compensate for variation in the length of animals, in which adjusted position the hanger will be held yieldably at a normal central point.

With the above objects in view the invention consists in certain peculiarities of construction and combination of mechanical elements as set forth hereinafter with reference to the accompanying drawings and subsequently claimed.

In the drawings Figure 1 represents a longitudinal sectional elevation of a hanger embodying the features of my invention, the section being indicated by lines 1—1 of Figs. 2 and 4; Fig. 2, a detailed cross-section of the same, the section being indicated by line 2—2 of Fig. 1; Fig. 3, a detailed cross-section as indicated by line 3—3 of Fig. 1, and Fig. 4, a diagrammatic plan view illustrating the position of the hanger with relation to the head and foot of the stall in which an animal is shown affixed by a stanchion.

Referring by characters to the drawing, 1 represents the transversely disposed overhead stall beam of ordinary type to which is attached a tubular guide 2, the attachment being effected by a clip member 3, which clip member is secured by bolts 3' to the upper wall of the tubular guide, the said bolts being countersunk to present an unobstructed surface within the guide. The tubular guide, as best shown in the diagram view Fig. 4, is arranged at a right angle to the overhead stall beam or longitudinally of the stall. The tubular guide is open at its ends and provided with a bottom longitudinal slot 2' and two series of transversely disposed apertures 4 arranged at the opposite ends of the guide. Fitted into the bore of the tubular guide is the circular head of a slidable block 5, the same being provided with an apertured ear 5' that extends through the slot for connection to a series of links 6, the bottom one of which series is secured to a stanchion 7 of the bow type, whereby said stanchion is suspended from the hanger. Fitted through companion pairs of the guide apertures 4 are stops 8 comprising key-pins and interposed between the key-pins and the block 5 are coiled springs 9, 9, the same being under approximate uniform tension.

It is obvious that, owing to the overhead longitudinal disposition of the tubular guide, should the confined animal desire to move forward or backward, the compensating springs 9 will readily permit such action while, at the same time they will exert a gentle draw upon the shoulders of the animal to cause the latter to return to its normal position with relation to the head and foot of the stall unconsciously and without injuring said animal by strain of the stanchion upon its shoulders or neck. It is also apparent that the floating block, together with its opposing springs, can be manually shifted from the central position shown with relation to the overhead stall beam forward or backward, depending upon the length of the animal, whereby said animal will be properly positioned with relation to its alinement to the dropping trough, the action of the floating block being similar irrespective of its predetermined set position with relation to the tubular hanger.

I claim:

A stanchion hanger comprising an overhead support, a tubular guide suspended therefrom, the guide having a base slot extending longitudinally thereof and adjacent each end being provided with a row of regularly spaced openings, a block slidable in the guide and having a pendent portion projecting through the slot of the guide, means for flexibly connecting the pendent portion with a stanchion, springs within the guide and disposed on opposite sides and abutting the block, and stops for selective engagement with the openings of the guide and forming abutments for the springs and serving to adjust the tension of said springs.

In testimony that I claim the foregoing I have hereunto set my hand at Oconomowoc in the county of Waukesha and State of Wisconsin in the presence of two witnesses.

WILLIAM F. WEBER.

Witnesses:
BENJ. G. EDGERTON,
PAUL AUCKLEY.